United States Patent
Diab

(10) Patent No.: US 8,279,788 B2
(45) Date of Patent: Oct. 2, 2012

(54) METHOD AND SYSTEM FOR STATEFUL NEGOTIATION OF ENERGY EFFICIENT PARAMETERS IN LAYER 2

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 95 days.

(21) Appl. No.: 12/478,654

(22) Filed: Jun. 4, 2009

(65) Prior Publication Data

US 2010/0177648 A1 Jul. 15, 2010

Related U.S. Application Data

(60) Provisional application No. 61/144,114, filed on Jan. 12, 2009.

(51) Int. Cl.
*G08C 17/00* (2006.01)
(52) U.S. Cl. .................................. 370/311; 455/343.2
(58) Field of Classification Search .................. 370/252, 370/311; 455/343.1, 343.2, 574, 127.1, 127.5
See application file for complete search history.

(56) References Cited

U.S. PATENT DOCUMENTS

| | | | | |
|---|---|---|---|---|
| 5,950,124 A | * | 9/1999 | Trompower et al. | 455/422.1 |
| 6,549,759 B2 | * | 4/2003 | Arviv et al. | 455/69 |
| 6,628,946 B1 | * | 9/2003 | Wiberg et al. | 455/434 |
| 6,795,450 B1 | | 9/2004 | Mills et al. | |
| 6,831,898 B1 | | 12/2004 | Edsall | |
| 6,992,986 B2 | * | 1/2006 | Reza et al. | 370/252 |
| 7,583,973 B2 | * | 9/2009 | Harris et al. | 455/458 |
| 7,756,003 B1 | * | 7/2010 | Lee et al. | 370/208 |
| 2006/0034295 A1 | | 2/2006 | Cherukuri et al. | |
| 2007/0091813 A1 | * | 4/2007 | Richard et al. | 370/248 |
| 2007/0174031 A1 | * | 7/2007 | Levenshteyn et al. | 703/13 |
| 2007/0280239 A1 | | 12/2007 | Lund | |
| 2008/0225841 A1 | | 9/2008 | Conway et al. | |
| 2009/0093243 A1 | * | 4/2009 | Lee et al. | 455/418 |

(Continued)

FOREIGN PATENT DOCUMENTS

EP 1 473 870 11/2004

(Continued)

OTHER PUBLICATIONS

Definition of "direct" from http://legal-dictionary.thefreedictionary.com/direct, accessed Nov. 30, 2011.*

(Continued)

*Primary Examiner* — Kerri Rose
(74) *Attorney, Agent, or Firm* — Duane S. Kobayashi

(57) ABSTRACT

A method and system for stateful negotiation of energy efficient parameters in Layer 2 are provided. In this regard, energy efficiency of communications between a first network device and a second network device may be managed via an exchange of information between the network devices and a verification of whether the information is up-to-date prior to utilizing the information. In various embodiments of the invention, the second network device may generate a decision pertaining to implementing one or more energy efficient techniques and the second network device may send a message to the first network device requesting that the first network device implement the decision. The message sent to the first network device may comprise the decision as well as parameter values utilized to generate the decision. The first network device may receive the decision and the parameter values and may determine whether the received parameter values are up-to-date.

21 Claims, 6 Drawing Sheets

U.S. PATENT DOCUMENTS

| | | | |
|---|---|---|---|
| 2010/0091666 A1* | 4/2010 | Silva et al. | 370/252 |
| 2010/0166015 A1* | 7/2010 | van Greunen et al. | 370/474 |
| 2010/0241880 A1 | 9/2010 | Werthiemwer et al. | |
| 2010/0262848 A1 | 10/2010 | Bobrek et al. | |
| 2010/0309776 A1* | 12/2010 | Alharbi et al. | 370/216 |

FOREIGN PATENT DOCUMENTS

| | | |
|---|---|---|
| EP | 1 484 876 | 12/2004 |
| EP | 1 494 407 | 1/2005 |
| GB | 2 337 672 | 11/1999 |
| WO | WO 00/31923 | 6/2000 |

OTHER PUBLICATIONS

European Search Report corresponding to European Patent Application No. 10000117.1-2416 dated Mar. 24, 2010.

LAN/MAN Standards Committee: "IEEE Draft P803.3az/D1.0." Nov. 1, 2008, Retrieved from the Internet: http://www.ieee802.org/3/az/>, XP002572311.

Gunaratne et al., "Reducing the energy consumption of ethernet with adaptive link rate (ALR)." IEEE Transactions on Computers, vol. 57, No. 4, Apr. 2008, XP002572312.

Teener, "Audio/Video Bridging for Home Networks (IEEE 802.1 AV Bridging Task Group)" [Online] Jun. 1, 2007, http://www.ieee802.org/3/eee_study/public/jul07/teener_1_0707.pdf.

Grow, "802.1 and Energy Efficient Ethernet." Sep. 11, 2007, pp. 1-6, XP002509616.

Bennett et al., "Energy Efficient Ethernet." Jul. 16, 2007, pp. 1-70, XP002509615.

EPO Communication pursuant to Article 94(3) EPC, dated Dec. 15, 2010, pp. 1-3.

Gupta et al., "Dynamic Ethernet Link Shutdown for Energy Conservation on Ethernet Links." XP-002524616, pp. 6156-6161, 2007.

Wael Diab, "Energy Efficient Ethernet and 802.1." IEEE 802 Plenary, Nov. 16, 2007, XP-002524617.

* cited by examiner

US 8,279,788 B2

METHOD AND SYSTEM FOR STATEFUL NEGOTIATION OF ENERGY EFFICIENT PARAMETERS IN LAYER 2

CROSS-REFERENCE TO RELATED APPLICATIONS/INCORPORATION BY REFERENCE

This patent application makes reference to, claims priority to and claims benefit from U.S. Provisional Patent Application Ser. No. 61/144,114 filed on Jan. 12, 2009.

The above stated application is hereby incorporated herein by reference in its entirety.

FIELD OF THE INVENTION

Certain embodiments of the invention relate to networking. More specifically, certain embodiments of the invention relate to a method and system for a protocol with stateful negotiation for energy efficient parameters in layer 2.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often result in significant increases in power consumption.

New transmission technologies enable higher transmission rates over copper cabling infrastructures. Various efforts exist in this regard, including technologies that enable transmission rates that may even reach 100 Gigabit-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. With each 10× rate increase more sophisticated signal processing is required to maintain the 100 m standard cable range. Non-standard transmission rates comprise 2.5 Gbps as well as 5 Gbps.

The specification for 10 Gigabit-per-second (Gbps) Ethernet transmissions over twisted-pair cabling (10 GBASE-T) is intended to enable 10 Gbps connections over twisted-pair cabling at distances of up to 182 feet for existing cabling, and at distances of up to 330 feet for new cabling, for example. To achieve full-duplex transmission at 10 Gbps over four-pair twisted-pair copper cabling, elaborate digital signal processing techniques are needed to remove or reduce the effects of severe frequency-dependent signal attenuation, signal reflections, near-end and far-end crosstalk between the four pairs, and external signals coupled into the four pairs either from adjacent transmission links or other external noise sources. New IEEE cabling specifications are being considered for 40 Gbps and 100 Gbps rates.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a protocol with stateful negotiation for energy efficient parameters in Layer 2, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for stateful negotiation of energy efficient parameters in layer 2. In this regard, energy efficiency of communications between a first network device and a second network device may be managed via an exchange of information between the network devices and a verification of whether the information is up-to-date prior to utilizing the information. In various embodiments of the invention, the second network device may generate a decision pertaining to implementing one or more energy efficient techniques and the second network device may send a message to the first network device requesting that the first network device implement the decision. The message sent to the first network device may comprise the decision as well as parameter values utilized to generate the decision. The first network device may receive the decision and the parameter values and may determine whether the received parameter values are up-to-date.

The first network device may determine whether to implement the decision based on whether the received parameter values are up-to-date. The first network device may determine whether the received parameter values are out-of-date by comparing them to locally stored parameter values. The decision and the parameter values may be exchanged via one or more logical link discovery protocol data units (LLDPDUs). The first network device may determine whether to comply with the request based on whether one of the first network device and the second network device is a master device. In instances that the received parameter vales are out-of-date, the first network device may send one or more messages to the second network device to update the parameter values. The first network device may also determine whether the request itself is out-of-date, and in instances that it is, may ignore the request. The first network device may update the contents of one or more state registers upon the occurrence of one or more of: reception of a message from the second network device, transmission of a message to the second network device, update of one or more of the parameter values, and reception of an out-of-date parameter value.

In various embodiments of the invention, the first network device may implement the decision upon determining that the second network device has complied with the request. The first network device may determine compliance with the request based on, for example, an explicit response from the first network device or a lack of response from the second network device.

Figure 1A:
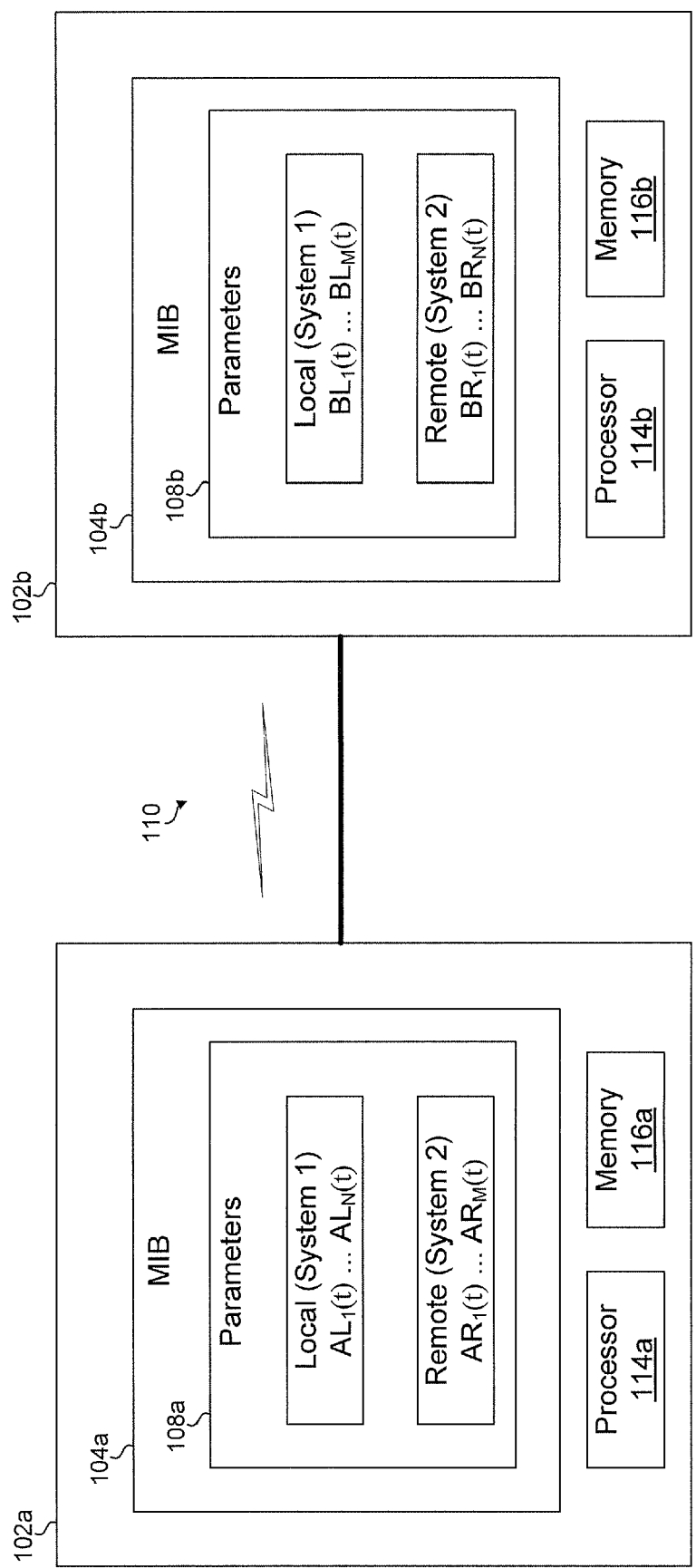
FIG. 1A is a diagram illustrating link partners which may utilize stateful communication of networking parameters, in accordance with an embodiment of the invention.

FIG. 1A is a diagram illustrating link partners which may utilize stateful communication of networking parameters, in accordance with an embodiment of the invention. Referring to FIG. 1A, the network devices 102a and 102b may be link partners that may communicate over a connection 110 which may comprise one or more wired, wireless, and/or optical links. The network device 102a may comprise a management entity 104a for managing local networking parameters $AL_1(t), \ldots, AL_N(t)$ and remote networking parameters $AR_1(t), \ldots, AR_M(t)$, where N and M are integers. The network device 102b may comprise a management entity 104b for managing local networking parameters $BL_1(t), \ldots, BL_M(t)$ and remote networking parameters $BR_1(t), \ldots, BR_N(t)$, where N and M are integers.

The local networking parameters $AL_1(t), \ldots, AL_N(t)$ may indicate capabilities and/or configuration of the network device 102a. The local networking parameters may be dynamic and thus the notation $AL_X(t)$, where X is an integer between 1 and N, corresponds to the value of local parameter $AL_X$ at time instant t, where t is not necessarily the current time but is the time at which $AL_X$ was last updated. In this regard, the local networking parameters $AL_1(t), \ldots, AL_N(t)$ may be stored in the management block 104a but may be generated and/or maintained by other portions of the network device 102a, such as a processor, a MAC, a PHY, or an EEN module.

In various embodiments of the invention, one or more of the local networking parameters $AL_1(t), \ldots, AL_N(t)$ may be associated with energy efficient networking techniques implemented by the network device 102a. Some exemplary networking parameters may comprise: a parameter that indicates EEN techniques, such as LPI and subset PHY (also referred to as subrating), supported by the network device 102a; a parameter that indicates subset PHY data rates supported by the network device 102a; one or more networking parameters that indicate an amount of time required for the network device 102a to transition into one or more energy saving modes, one or more networking parameters that indicate an amount of time required for the network device 102a to transition out of one or more energy saving modes; a parameter that indicates whether the network device 102a is operating in an energy saving mode; a parameter that indicates whether an EEN transition or other event is scheduled to occur in the network device 102a; and an amount of time for which the network device may operate in an energy-saving mode.

The local networking parameters $BL_1(t), \ldots, BL_M(t)$ may indicate capabilities and/or configuration of the network device 102b. In this regard, the local networking parameters $BL_1(t), \ldots, BL_M(t)$ of the network device 102b may be analogous to the local networking parameters $AL_1(t), \ldots, AL_N(t)$ are to the network device 102a.

The remote networking parameters $AR_1(t), \ldots, AR_M(t)$ may indicate capabilities and/or configuration of network device 102b. In this regard, the remote networking parameters $AR_1(t), \ldots, AR_M(t)$ in the network device 102a may correspond to the local networking parameters $BL_1(t), \ldots, BL_M(t)$ in the network device 102b. Thus, the remote networking parameters $AR_1(t), \ldots, AR_M(t)$ may ideally match the networking parameters $BL_1(t), \ldots, BL_M(t)$. However, because there may be some delay between the network device 102b updating a parameter $BL_X$, and the update being received and processed by the network device 102a, $AR_X$ may not always match $BL_X$. Accordingly, aspects of the invention may enable preventing or reducing the occurrence of outdated networking parameters being utilized by the network devices 102a and 102b.

In various embodiments of the invention, one or more of the remote networking parameters $AR_1(t), \ldots, AR_M(t)$ may be associated with energy efficient networking techniques implemented by the network device 102b. In this regard, implementation of energy efficient networking techniques may depend on the values of one or more of the parameters. In this manner, energy consumption in the network device 102b may be managed based on the value of one or more parameters. Some exemplary parameters may comprise: a parameter that indicates EEN techniques, such as LPI and subset PHY, supported by the network device 102b; a parameter that indicates subset PHY data rates supported by the network device 102b; one or more parameters that indicate an amount of time required for the network device 102b to transition into one or more energy saving modes; one or more parameters that indicate an amount of time required for the network device 102b to transition out of one or more energy saving modes; a parameter that indicates whether the network device 102b is operating in an energy saving mode; a parameter that indicates whether an EEN transition or other event is scheduled to occur in the network device 102b; and an amount of time for which the network device may operate in an energy-saving mode.

The remote networking parameters $BR_1(t), \ldots, BR_N(t)$ may indicate capabilities and/or configuration of network device 102a. In this regard, the remote networking parameters $BR_1(t), \ldots, BR_N(t)$ in the network device 102b may correspond to the local networking parameters $AL_1(t), \ldots, AL_M(t)$ in the network device 102a. In this regard, $BR_1(t), \ldots, BR_N(t)$ of the network device 102b may be analogous to the remote networking parameters $AR_1(t), \ldots, AR_N(t)$ are to the network device 102a.

The processors 114a and 114b may each comprise suitable logic, circuitry, interfaces, and/or code that may be operable to process data, generate signals, and/or execute code to effectuate operation of the link partners 102 and 104, respectively. In this regard, the processors 114a and 114b may each be operable to manage communications based on, for example, a current state of operation, one or more past states of operation, and/or the occurrence of one or more events. In this regard, "events" may comprise, for example, changes and/or determinations made by one or both of the link partners 102a and 102b and/or messages sent and/or received by one or both of the link partners 102a and 102b.

The memories 116a and 116b may comprise suitable logic, circuitry, interfaces, and/or code that may be operable to effectuate operation of the link partners 102 and 104, respectively. In this regard, instructions executed by the processor 304 may be stored in the memory 306, parameters configured by a network administrator may be stored in the memory 306, and at least a portion of the configuration and/or control signals 322 may be stored in the memory 306. Furthermore, the memories 116a and 116b may each store state information pertaining to, for example, a current state of operation, past state(s) of operation, past decisions, and/or past messages exchanged. In this manner, the memories 116a and 116b may support a stateful communication of parameters between the link partners 102 and 104.

In operation, the network devices 102a and 102b may exchange parameters utilizing one or more protocols such as link layer discovery protocol (LLDP). The parameters may be utilized to make various decisions about the configuration and/or operation of the network devices 102a and 102b. Consequently, in instances that stale parameters are utilized in making a decision, the result of the decision may be invalid or sub-optimal. In this regard, parameters may become stale due to one or more of the asynchronous nature of such protocols, polling latencies by agents running on each network device, processing latencies, transmission latencies, and/or reception latencies. For example, network device 102a may have updated its local networking parameters and not yet communicated the change to network device 102b, or the communicated change may not yet have arrived at, or been processed by, the network device 102b.

Thus, aspects of the invention may comprise a stateful protocol that runs instead of, or in addition to, protocols such as LLDP. The protocol may be stateful in that one or both of the network devices 102a and 102b may comprise a state machine, which may comprise one or more memory elements, that may enable one or both of the link partners 102a and 102b to track, or "remember," a past sequence of events and/or determine a next action and/or sequence of events. In this manner, the stateful protocol may enable management and communication of the parameters such that network devices 102a and 102b may be operable to detect when parameters are stale and/or when stale parameters have been utilized in making a decision. The network devices 102a and 102b may operate in a plurality of states at various times and the network devices may transition between these states upon the occurrence of various. Moreover, a state to which a link partner transitions may depend on past states and/or the event that triggers the transition. Triggering events may comprise, for example, a change in one or more local networking parameters, a received update for one or more remote networking parameters, a decision being made utilizing one or more remote and/or local networking parameters, data being transmitted by a network device 102a or 102b, and/or data being received by a network device 102a or 102b. In this manner, a state machine running on each of the network devices 102a and 102b may enable initialization, negotiation, and/or reconciliation of link parameters and/or decisions based on the parameters.

Figure 1B:
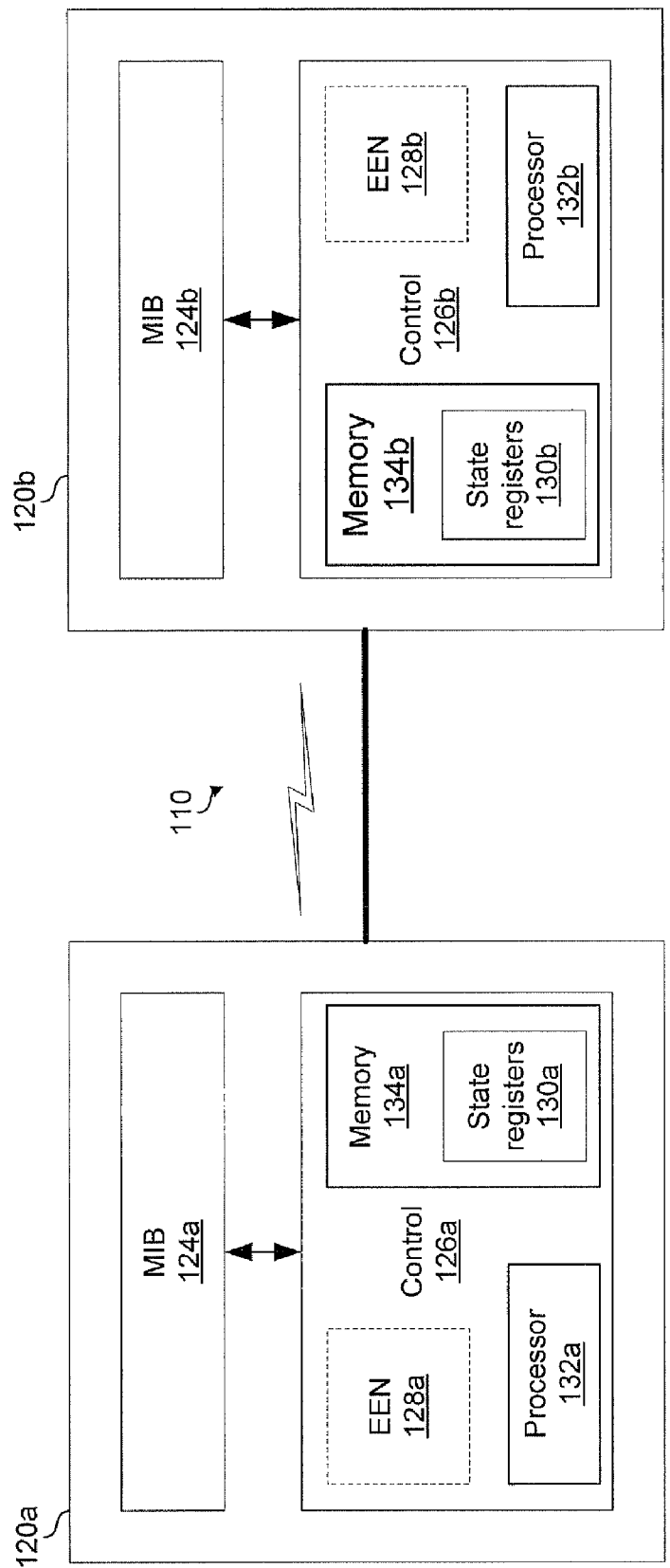
FIG. 1B is a diagram illustrating link partners operable to implement a stateful exchange of messages to implement energy efficient networking, in accordance with an embodiment of the invention.

FIG. 1B is a diagram illustrating link partners operable to implement a stateful exchange of messages to implement energy efficient networking, in accordance with an embodiment of the invention. Referring to FIG. 1B, there is shown network devices 120a and 120b. The network device 120a may comprise a control module 126a which may comprise a processor 132a and a memory 134a and may implement an EEN control policy 128a. Likewise, the network device 120b may comprise a control module 126b which may comprise a processor 132b and a memory 134b and may implement an EEN control policy 128b.

The network device 120a and 120b may be substantially similar to the network devices 102a and 102b described with respect to FIG. 1A. The management entities 124a and 124b may be substantially similar to the management entities 104a and 104b described with respect to FIG. 1A.

The control modules 126a and 126b may each comprise suitable logic, circuitry, interfaces, and/or code that may be operable to control and/or manage operation of the network devices 120a and 120b, respectively. In this regard, control modules 126a and 126b may control communications over the connection 110. As part of controlling the communications over the connection 110, the control modules 126a and 126b may each be operable to manage networking parameters and to implement energy efficient Ethernet techniques. Accordingly, the control modules 126a and 126b may each be operable to execute code and/or run applications or programs and to exchange signals with various other portions of the network devices 120a and 120b, respectively. In an exemplary embodiment of the invention, stateful communication between the link partners 102 and 104 may be managed by the processors 132a and 132b by executing code stored in the memories 134a and 134b, respectively. Moreover, decisions and/or actions performed by the processors 132a and 132b may be determined based on state registers 130a and 130b stored in the memories 134a and 134b, respectively. In this regard, the processors 132a and 132b may be similar to the processors 114a and 114b described with respect to FIG. 1A and the memories 134a and 134b may be similar to the memories 116a and 116b described with respect to FIG. 1A.

The EEN control policies 128a and 128b may be operable to balance the tradeoff between performance and power consumption in the network devices 120a and 120b and on the network link(s). The EEN control policies 128a and 128b may determine a mode of operation of the network devices 120a and 120b, respectively. The EEN control policies 128a and 128b may implement, for example, low power idle and/or subset PHY techniques. The EEN control policies 128a and 128b may generate one or more control signals for configuring the network devices 120a and 120b, respectively, to implement the EEN techniques. The EEN control policies 128a and 128b may generate EEN control signals and/or packets to be communicated to a link partner to, for example, coordinate transitions between modes of operation. The EEN control policies 128a and 128b may receive EEN control signals and/or packets from a link partner to, for example, coordinate transitions between modes of operation.

The one or more state registers 130a may comprise suitable logic, circuitry, and/or code that may enable implementation of one or more state machines for managing networking parameters in the network device 120a. Similarly, the one or more state registers 130b may comprise suitable logic, circuitry, and/or code that may enable implementation of one or more state machines for managing networking parameters in the network device 120b. In this regard, the state registers 130a and 130b may be utilized to control and/or track, for example, when networking parameters were updated, when networking parameters were communicated to a link partner, when updates of networking parameters were received from a link partner, when decisions utilizing network parameters were made, and what messages have been communicated to and/or received from a link partner.

In an exemplary embodiment of the invention, whether a parameter has been communicated, received, and/or updated may be determined via unique sequence numbers in messages exchanged between the network devices 120a and 120b. For example, the network device 120a may send a message to network device 120b to update a remote parameter in the network device 120b. The message may comprise a unique sequence number and the network device 120b may utilize the sequence number to determine whether the message is outdated. For example, the network device 120b may determine whether a message with a more recent sequence number had already been seen.

In operation, the control module 126a, utilizing the EEN control policy 128a and the state register(s) 130a, may determine when to enter and/or exit an energy saving mode of operation. The determination may be based, at least in part, on the value of one or more networking parameters stored in the management entity 124a and/or in the management entity 124b. The control module 126a may maintain and/or update local networking parameters stored in the management entity 124a. In this regard, the control module 126a may determine whether the local parameters are up-to-date by, for example, polling other portions of the network device 120a. The control module 126a may manage, maintain and/or update remote networking parameters stored in the management entity 124a. In this regard, the control module 126a and may determine whether the remote parameters in the management entity 124a are up-to-date by, for example, exchanging messages with the network device 120b. The control module 126a may maintain and/or update remote networking parameters stored in the networking device 120b by, for example, exchanging a sequence of messages with the network device 120b. Sequences of messages, and the corresponding validating and/or updating of networking parameters, may be coordinated based on the state of the state register(s) 130a. In this regard, information such as which messages have been sent, which messages have been received, whether one or more outdated networking parameters have been detected, and whether one or more networking parameters have been updated may be tracked utilizing the state register(s) 130a.

Similarly, the control module 126b, utilizing the EEN control policy 128b and the state register(s) 130b, may determine when to enter and/or exit an energy saving mode of operation. The determination may be based, at least in part, on the value of one or more networking parameters stored in the management entity 124b and/or in the management entity 124a. The control module 126b may maintain and/or update local networking parameters stored in the management entity 124b. In this regard, the control module 126b may determine whether the local parameters are up-to-date by, for example, polling other portions of the network device 120b. The control module 126b may maintain and/or update remote networking parameters stored in the management entity 124b. In this regard, the control module 126b and may determine whether the remote parameters in the management entity 124b are up-to-date by, for example, exchanging messages with the network device 120a. The control module 126b may manage, maintain and/or update remote networking parameters stored in the networking device 120a by, for example, exchanging a sequence of messages with the network device 120a. Sequences of messages, and the corresponding validating and/or updating of networking parameters, may be coordinated based on the state of the state register(s) 130b. In this regard, information such as which messages have been sent, which messages have been received, whether one or more outdated networking parameters have been detected, and whether one or more networking parameters have been updated may be tracked utilizing the state register(s) 130b.

Figure 2:
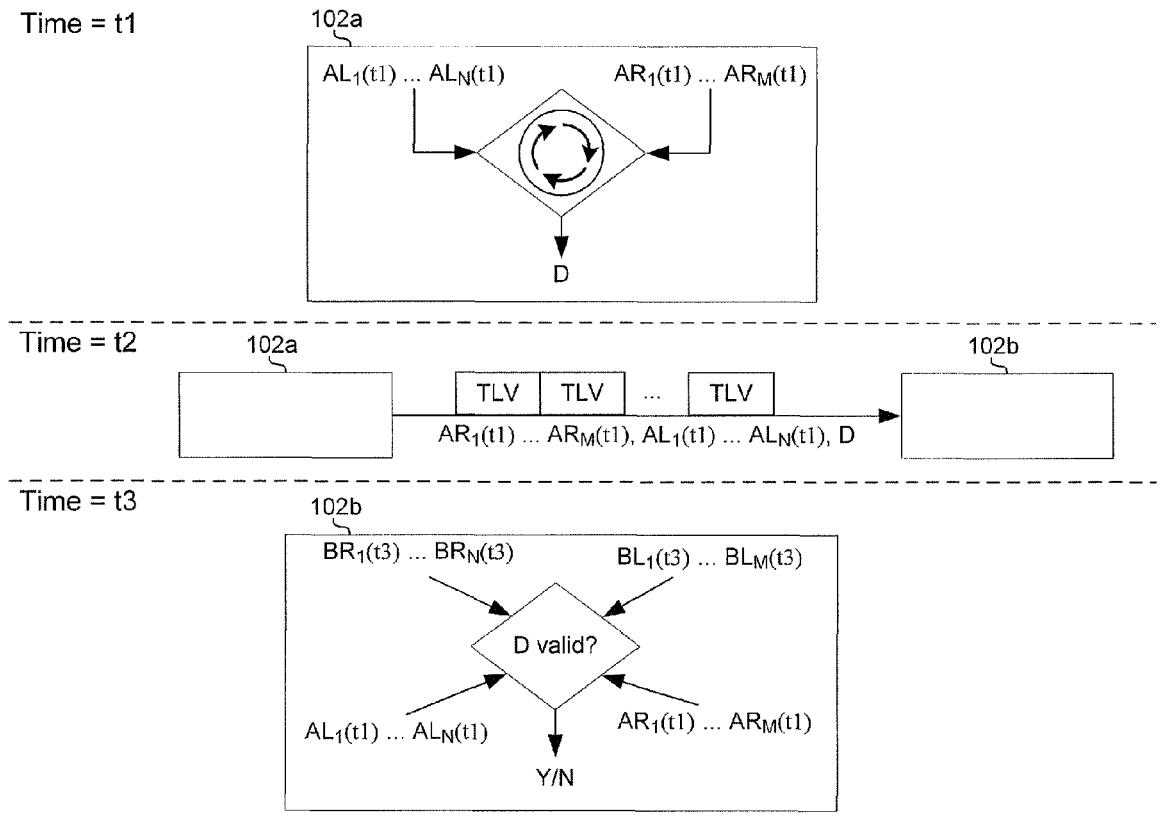
FIG. 2 is a diagram illustrating management and communication of networking parameters utilizing a stateful protocol to prevent invalid or sub-optimal decisions, in accordance with an embodiment of the invention.

FIG. 2 is a diagram illustrating management and communication of networking parameters utilizing a stateful protocol to prevent invalid or sub-optimal decisions, in accordance with an embodiment of the invention. FIG. 2 illustrates an exemplary embodiment of the invention where network device 102a makes a decision D and communicates that decision to network device 102b, where D may represent a generic result of a decision, calculation, or other process and may be sent to the network device 102b as a request for network device 102b to implement the decision D. In an exemplary embodiment of the invention, D may correspond to a value for one or more parameters $BL_1 \ldots BL_M$ and a message sent to the network device 102b may comprise a request for network device 102b to set the value of one or more of $BL_1 \ldots BL_M$ to D. Although FIG. 2 illustrates the exchange being initiated in network device 102a, anything described with respect to FIG. 2 may occur in a direction opposite of that illustrated and/or described.

At time instant t1, there is shown the network device 102a utilizing networking parameters $AL_1(t1), \ldots, AL_N(t1)$ and $AR_1(t1), \ldots, AR_M(t1)$ to generate D. At time instant t2 as part of a stateful protocol, the network device 102a may communicate D, along with the values of one or more of the networking parameters utilized to generate D, to the network device 102b. In this regard, the network device 102a may send one or more of $AL_1(t1), \ldots, AL_N(t1)$ and/or $AR_1(t1), \ldots, AR_M(t1)$ to the network device 102b.

At time instant t3, the network device 102b may determine whether the networking parameters utilized by network device 102a to arrive at D are up-to-date. In this regard, it may be determined whether one or more of $AR_1(t1), \ldots, AR_M(t1)$ match the corresponding one or more of $BL_1(t3), \ldots, BL_M(t3)$. That is, the network device 102b may determine whether one or more of $AR_1, \ldots, AR_M$ were up-to-date at time t1 and/or whether one or more of the corresponding networking parameters $BL_1, \ldots, BL_M$ has changed and is no longer equal to the corresponding value of $AR_1, \ldots, AR_M$ at time t1.

In instances, that the networking parameters are up-to-date and have not changed, the network device 102b may recognize the decision 'D' as valid. In such instances, the network device 102b may or may not implement the decision. In this regard, in some embodiments of the invention, the network device 102b may be a master device and may be enabled to override decisions made by the network device 102a. In other embodiments of the invention, the network device 102a may be a master device and the network device 102b may be required to implement the decision D.

In instances that one or more parameters are stale, the network device 102b may ignore the decision D and may perform one or more actions in response to detecting the stale decision D. In this regard, after determining D to be stale, the network device 102a may simply drop the request and take no further action on it, the network device 102b may notify the network device 102a that D was stale and may provide updated parameters to the network device 102a, and/or the network device 102b may request or negotiate a different decision D' ("D prime") with the network device 102a.

In this manner, there may be a stateful determination and reconciliation of networking parameters and/or decisions between the network devices 102a and 102b such that the network devices may prevent or reduce the occurrence of operating based on stale networking parameters. In this regard, if one of the network devices 102a or 102b detects a stale networking parameter and/or sub-optimal decision, one or more messages may be exchanged to notify the other network device and to update the parameters and/or decision. Once both network devices agree on networking parameters and/or decisions, the network devices 102a and 102b may return to normal operation utilizing the up-to-date parameters and/or decisions.

In an exemplary embodiment of the invention, the network devices 102a and 102b may manage the networking parameters and communicate them to each other utilizing LLDP data units (LLDPDUs). A LLDPDU may carry one or more networking parameters in one or more fields formatted as a type-length-value (TLV). In various embodiments of the invention, standard and/or proprietary TLVs may be exchanged in one or more LLDPDUs. Exemplary proprietary TLVs for managing energy efficient networking (EEN) protocols may comprise a parameter that indicates EEN techniques, such as LPI and subset PHY, that are supported; a networking parameter that indicates subset PHY data rates supported; one or more networking parameters that indicate an amount of time required for a network device to transition into one or more energy saving modes; one or more networking parameters that indicate an amount of time required for a network device to transition out of one or more energy saving modes; a networking parameter that indicates whether a network device is operating in an energy saving mode; one or more networking parameters for jittering time intervals at which data is communicated over an idle channel or during inter packet gap and a networking parameter that indicates whether an EEN transition or other event is scheduled to occur in the network device 102b.

Figure 3A:
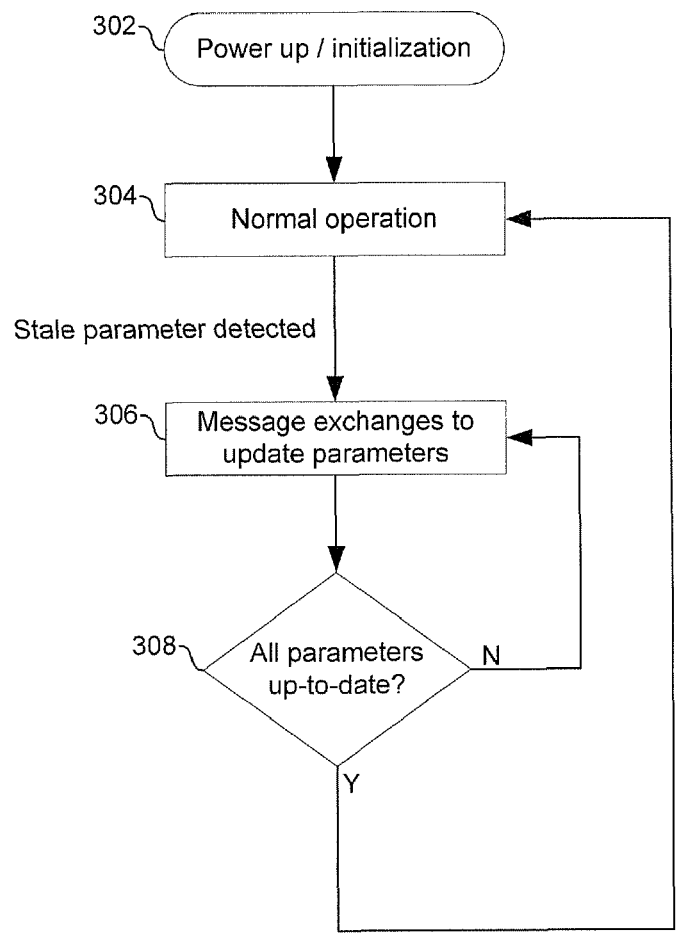
FIG. 3A is a flow chart illustrating exemplary steps for a stateful management of networking parameters, in accordance with an embodiment of the invention.

FIG. 3A is a flow chart illustrating exemplary steps for a stateful management of networking parameters, in accordance with an embodiment of the invention. Referring to FIG. 3A, the exemplary steps may begin with step 302 when a network device such as the network device 120a may power up and/or initialize. In this regard, power-up and initialization may correspond to a first state of the state register(s) 128a. Subsequent to step 302, the exemplary steps may advance to step 304.

In step 304, the network device 120a may begin normal operation. In this regard, normal operation may correspond to a second state of the state register(s) 128a. During normal operation, the network device 120a may operate in and/or transition between one or modes of operation. In this regard, the modes of operation may comprise energy saving modes such as low power idle and/or one or more subset PHY modes. The mode(s) of operation in which the network device 120a operates, and the transitions between modes of operation, may be determined, at least in part, by networking parameters stored in the management entity 124a of the network device 102a. Therefore, reliable operation of the network device and communication with a link partner may require keeping networking parameters up-to-date and making decisions utilizing up-to-date networking parameters. Accordingly, when a stale parameter is detected the exemplary steps may advance to step 306.

In step 306, the network device 120a may exchange a sequence of messages with a link partner to update networking parameters. In this regard, the exchange of messages may reconcile the values of networking parameters stored in the network device 120a with the values of the corresponding parameters stored in the link partner. The sequence of messages may correspond to a sequence of states of the state register(s) 120a. In this manner, the state register(s) 120a may enable, for example, tracking the status of the messages exchanged, the status of the parameter(s) being updated, and determining whether decisions made by the network device 120a and/or the network device 120b have been made utilizing stale parameters. In various embodiments of the invention, the messages may comprise link layer discovery protocol data units (LLDPDUs) and the networking parameters may be communicated in type-length-value (TLV) fields. Subsequent to step 306, the exemplary steps may advance to step 308.

In step 308, it may be determined whether the relevant networking parameters have been updated. In instances that the parameters have been updated, the state register(s) 128a may transition back to the normal operation state and the exemplary steps may return to step 304. In instances that parameters are still outdated, the exemplary steps may return to step 306.

Figure 3B:
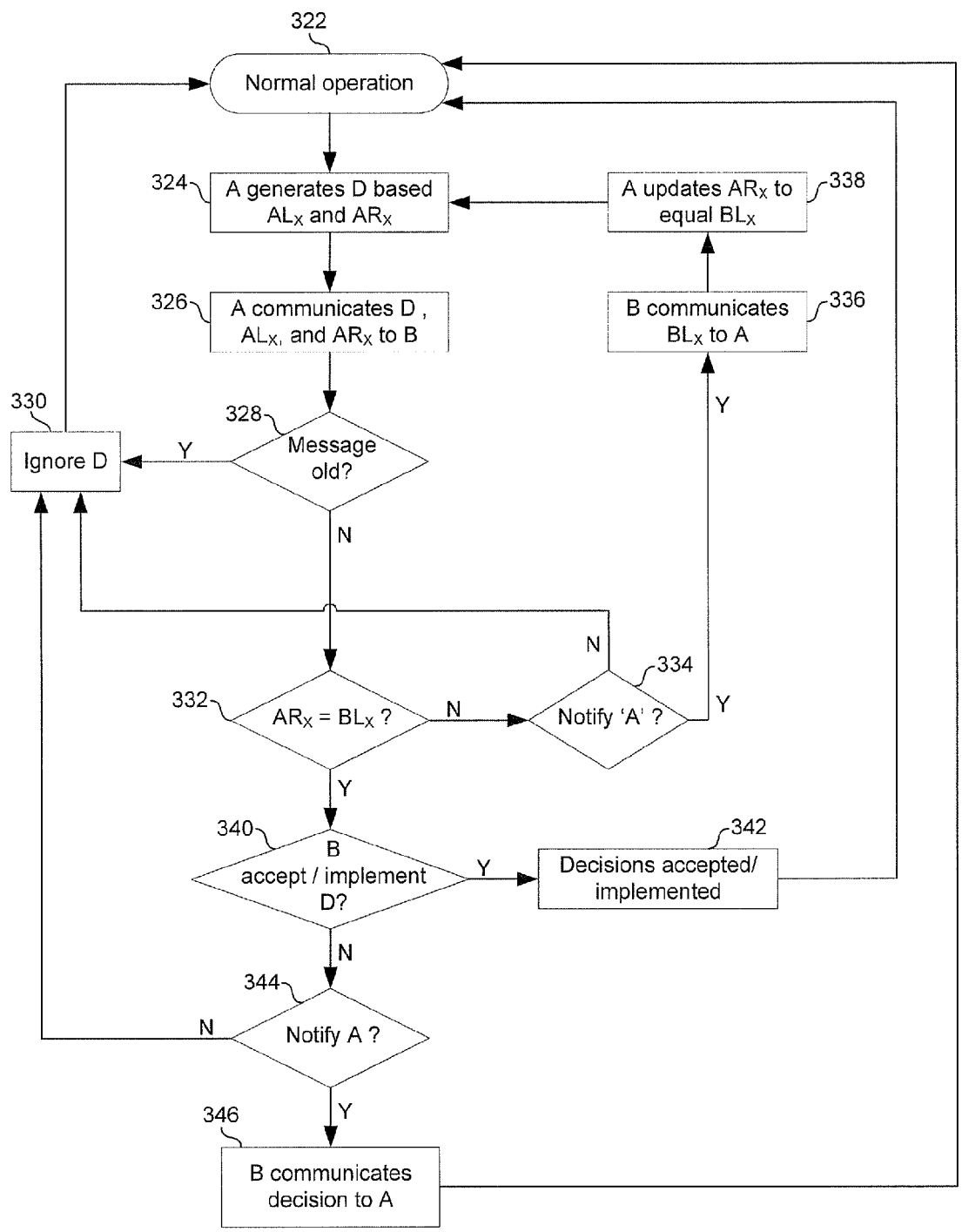
FIG. 3B is a flow chart illustrating exemplary steps for a stateful exchange for implementing energy efficient networking decisions, in accordance with an embodiment of the invention.

FIG. 3B is a flow chart illustrating exemplary steps for a stateful exchange for implementing energy efficient networking decisions, in accordance with an embodiment of the invention. Referring to FIG. 3B the exemplary steps may begin with step 322 in which two link partners, network devices 'A' and 'B' are operating and communicating normally. The network devices 'A' and 'B' may correspond to, for example, the networking devices 120a and 120b of FIG. 1B. Subsequent to step 322, the exemplary steps may advance to step 324.

In step 324, network device 'A' may generate a decision D based on the current values of parameters $AL_X$ and $AR_X$. Values of the local parameter $AL_X$ may be generated by the network device 'A' whereas values of the remote parameter $AR_X$ may reflect a networking parameter $BL_X$ generated by the network device 'B'. Accordingly, $AR_X$ may become stale during a period of time between network device 'B' updating $BL_X$ and network device 'A' receiving notification of the update and implementing the update. Subsequent to step 324, the exemplary steps may advance to step 326.

In step 326, network device 'A' may communicate a message comprising D and the current values of $AL_X$ and $AR_X$ to network device 'B'. For example, D and the current values of $AL_X$ and $AR_X$ may be communicated as TLV fields in one or more LLDPDUs. The message comprising D may be communicated to the network device 'B' as a request for the network device 'B' to implement the decision D. Subsequent to step 326, the exemplary steps may advance to step 328.

In step 328, the network device 'B' may receive a message from the network device 'A' and may determine whether the message is an old or redundant message. For example, the network device "a" may mark each message with a unique sequence number, and the network device 'B' may be operable to check the sequence number to determine whether a received message has already been received, or if a newer message has already been received. In this manner, the network device 'B' may avoid using stale information contained in a message that was, for example, delayed in the network. In instances that an old message is received, the exemplary steps may advance to step 330.

In step 330, the network device 'B' may ignore the received message. In this regard, the network device 'B' may not comply with the request to implement D because D is out dated. Subsequent to step 344, the exemplary steps may return to the previously described step 322.

Returning to step 328, in instances that a new message is received by the network device 'B' from the network device 'A', the exemplary steps may advance to step 332.

In step 332 the network device 'B' may determine whether the value of $AR_X$ received from the network device 'A' matches the current value of the local parameter $BL_X$. That is, the network device 'B' may determine whether the value of $AR_X$ utilized to generate D is still valid. In instances that the received value of $AR_X$ is different than the current value of $BL_X$, the exemplary steps may advance to step 334.

In step 334, the network device 'B' may determine whether to notify the network device 'A' of the outdated parameter. In instances that the network device 'B' does not notify the network device 'A', the exemplary steps may advance to the previously described step 330 In instances that the network device 'B' does determine to notify the network device 'A' of the outdated parameter(s), the exemplary steps may advance to step 336.

In step 336, network device 'B' may communicate the current value of $BL_X$ to network device 'A'. For example, the value of $BL_X$ may be communicated in one or more TLV fields of one or more LLDPDUs. Subsequent to step 336, the exemplary steps may advance to step 348.

In step 338, network device 'A' may update $AR_X$ to equal the received value of $BL_X$. Subsequent to step 338, the exemplary steps may advance to previously described step 324.

Returning to step 332, in instances that the received value of $AR_X$ is the same as the current value of $BL_X$, the exemplary steps may advance to step 340.

In step 340, the network device 'B' may determine whether to implement the decision D. In various embodiments of the invention, the determination of whether to implement the decision D may be based on a relationship between the network devices 'A' and 'B'. For example, in some embodiments of the invention, the network device 'A' may be a master device and the network device 'B' may be required to implement decisions received in non-outdated messages that were reached utilizing non-outdated parameters. In other embodiments of the invention, the network device 'B' may be a master device and may be enabled to ignore or override decisions made by the network device 'A'. In instances that the network device 'B' decides to implement the decision D, the exemplary steps may advance to step 342.

In step 342, the network device 'B' may implement the decision D. In various embodiments of the invention, implementing the decision D may comprise changing one or more parameter values and/or reconfiguring one or more portions of the network device. For example, the parameter $BL_X$ may be an amount of time that network device 'B' requires to transition into or out-of an energy saving state, D may correspond to a suggested value for the parameter $BL_X$, and, in step 342, the network device 'B' may set the value of $BL_X$ to D. In this manner, energy efficiency may be managed based on decisions exchanged between the network devices, and based on parameters stored in the network devices. Subsequent to step 342, the exemplary steps may return to the previously described step 322, Returning to step 340, in instances that the network device 'B' decides to not implement D, the exemplary steps may advance to step 344.

In step 344, the network device 'B' may determine whether to notify the network device 'A' that the decision 'B' will not be implemented. In instances that the network device 'B' does not notify the network device 'A', the exemplary steps may advance to the previously described step 330 In instances that the network device 'B' does determine to notify the network device 'A', the exemplary steps may advance to step 346.

In step 346, the network device 'B' may communicate its decision regarding D to the network device 'A'. In this regard, the network device 'B' may notify network device 'A' that the network device 'B' will not be implementing D. Alternatively and/or additionally, the network device 'B' may be negotiated with the network device 'A' to arrive at a decision D' ("D prime").

Figure 4:
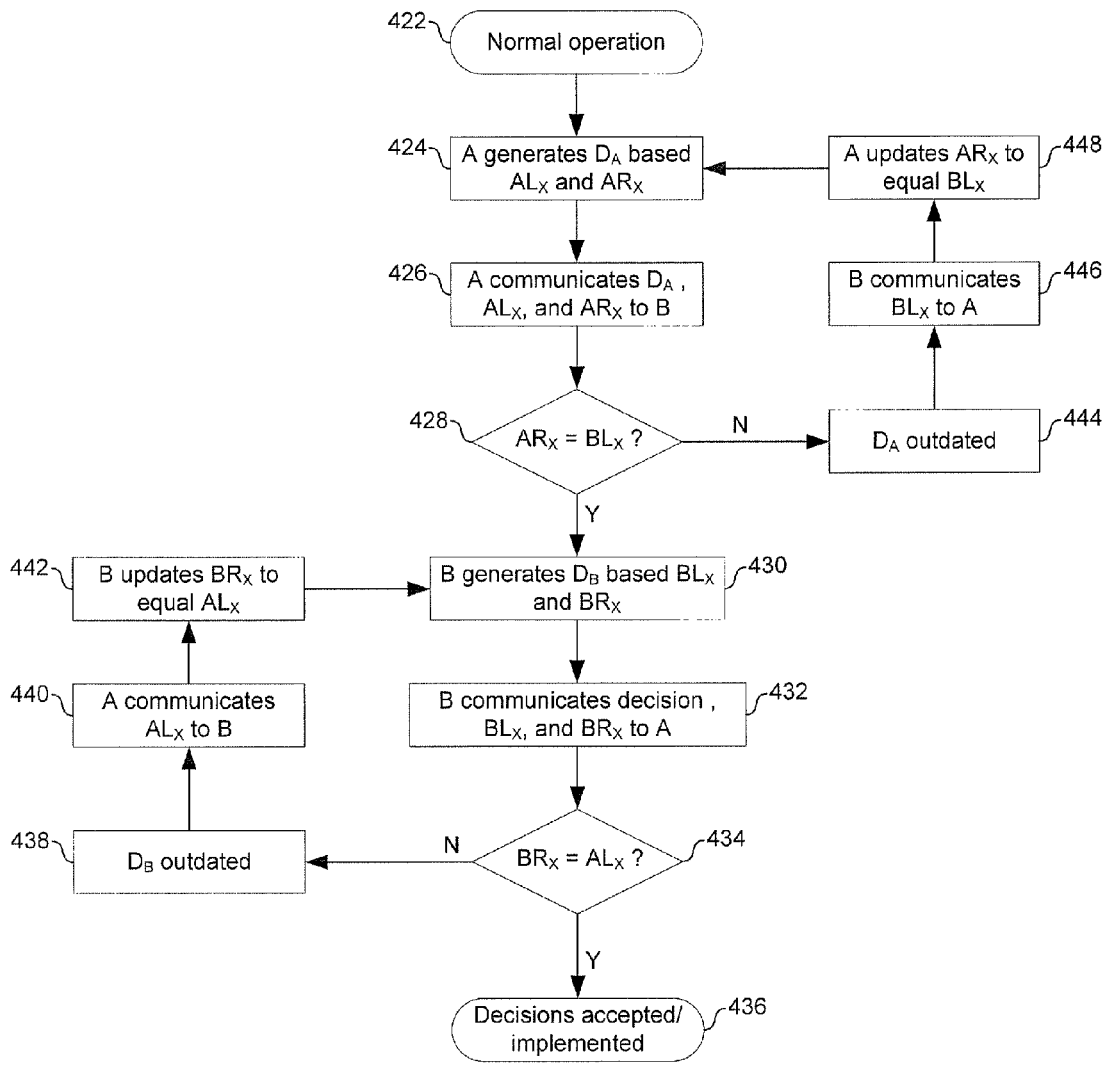
FIG. 4 is a flow chart illustrating exemplary steps for a stateful exchange and management of energy efficient decisions, in accordance with an embodiment of the invention.

FIG. 4 is a flow chart illustrating exemplary steps for a stateful exchange and reconciliation of energy efficient networking decisions, in accordance with an embodiment of the invention. Referring to FIG. 4 the exemplary steps may begin with step 422 in which two link partners, network devices 'A' and 'B' are operating and communicating normally. The network devices 'A' and 'B' which may correspond to, for example, the networking devices 120a and 120b of FIG. 1B. Subsequent to step 422, the exemplary steps may advance to step 424.

In step 424, network device 'A' may generate a decision $D_A$ based on the current values of $AL_X$ and $AR_X$. Values of the local parameter $AL_X$ may be generated by the network device 'A' whereas values of the remote parameter $AR_X$ may reflect a networking parameter $BL_X$ generated by the network device 'B'. Accordingly, $AR_X$ may become stale during a period of time between network device 'B' updating $BL_X$ and network device 'A' receiving notification of the update. Subsequent to step 424, the exemplary steps may advance to step 426.

In step 426, network device 'A' may communicate $D_A$ and the current values of $AL_X$ and $AR_X$ to network device 'B'. For example, $D_A$ and the current values of $AL_X$ and $AR_X$ may be communicated as TLV fields in one or more LLDPDUs. The message comprising D may be communicated to the network device 'B' as a request for the network device 'B' to implement the decision $D_A$. Subsequent to step 426, the exemplary steps may advance to step 428.

In step 428, network device 'B' may determine whether the value of $AR_X$ received from the network device 'A' matches the current value of the local parameter $BL_X$. That is, the network device 'B' may determine whether the value of $AR_X$ utilized to generate $D_A$ is still valid. In instances that the received value of $AR_X$ is the same as the current value of $BL_X$, the exemplary steps may advance to step 430.

In step 430, network device 'B' may generate a decision $D_B$ based on the current values of $BL_X$ and $BR_X$. In this regard, the decision $D_B$ in the network device 'B' may correspond to, or be equivalent to, the decision $D_A$ in the network device 'A'. For example, $D_A$ may be a decision as to how quickly the network device 'A' may wake up and begin transmitting, and $D_B$ may be a decision as to how quickly the network device 'B' may wake up and begin receiving. Subsequent to step 430, the exemplary steps may advance to step 432.

In step 432, network device 'B' may communicate $D_B$ and the current values of $BL_X$ and $BR_X$ to network device 'A'. For example, $D_B$ and the current values of $BL_X$ and $BR_X$ may be communicated as TLV fields in one or more LLDPDUs. Subsequent to step 432, the exemplary steps may advance to step 334.

In step 434, network device 'A' may determine whether the value of $BR_X$ received from the network device 'B' matches the value of $AL_X$. That is, network device 'A' may determine whether the value of $BR_X$ utilized to generate $D_B$ is still current. In instances that the received value of $BR_X$ is the same as the value of $AL_X$ the exemplary steps may advance to step 436.

In step 436, the network device 'A' may process data, implement a change, configure itself, and/or otherwise utilize the decisions $D_A$ and/or $D_B$. In some instances, validation of decision $D_A$ by network device 'B' may be sufficient to allow network device 'A' to utilize decision $D_A$. In other instances, utilizing the decision $D_A$ may require reconciling any differences between $D_A$ and $D_B$ and/or reaching a compromise between $D_A$ and $D_B$. For example, $D_A$ may indicate that network device 'A' can wake up and begin transmitting in $\alpha$ seconds and $D_B$ may indicate that network device 'B' may wake up and begin receiving in $\beta$ seconds, where $\beta > \alpha$. Accordingly, the network device 'A' may determine to wait $(\beta - \alpha)$ seconds after a period of operating in an energy saving mode before beginning transmissions to the network device 'B'.

Also in step 436, the network device 'B' may process data, implement a change, configure itself, and/or otherwise utilize the decisions $D_A$ and $D_B$. In some instances, validation of decision $D_B$ by network device 'A' may be sufficient to allow network device 'B' to utilize decision $D_B$. In other instances, utilizing the decision $D_B$ may require reconciling any differences between $D_A$ and $D_B$ and/or reaching a compromise between $D_A$ and $D_B$. For example, $D_A$ may indicate that network device 'A' can wake up and begin transmitting in α seconds and $D_B$ may indicate that network device 'B' may wake up and begin receiving in β seconds, where β>α. Accordingly, because the network device 'A' wakes up faster, the network device 'B' may allocate its maximum available memory to buffering received data so as to enable buffering β seconds worth of data.

Returning to step 434, in instances that network device 'A' detects that the received value of $BR_X$ is not equal to the current value of $AL_X$, the exemplary steps may advance to step 438. In step 438, the network device 'A' may, for example, set a flag and/or modify a state register to indicate that the received decision $D_B$ is outdated. Subsequent to step 438, the exemplary steps may advance to step 440.

In step 440, network device 'A' may communicate the current value of $AL_X$ to network device 'B'. For example, $AL_X$ may be communicated as TLV fields in one or more LLDPDUs. Subsequent to step 440, the exemplary steps may advance to step 442.

In step 442, network device 'B' may update $BR_X$ to equal the received value of $AL_X$. Subsequent to step 442, the exemplary steps may advance to previously described step 430.

Returning to step 428, in instances that network device 'B' detects that the received value of $AR_X$ is not equal to the current value of $BL_X$, the exemplary steps may advance to step 444. In step 444, the network device 'B' may, for example, set a flag and or modify a state register to indicate that the received decision $D_A$ is outdated. Subsequent to step 444, the exemplary steps may advance to step 446.

In step 446, network device 'B' may communicate the current value of $BL_X$ to network device 'A'. For example, $AL_X(t_{340})$ may be communicated as TLV fields in one or more LLDPDUs. Subsequent to step 446, the exemplary steps may advance to step 448.

In step 448, network device 'A' may update $AR_X$ to equal the received value of $BL_X$. Subsequent to step 448, the exemplary steps may advance to previously described step 424.

Various aspects of a method and system for stateful negotiation of energy efficient parameters in Layer 2 are provided. In an exemplary embodiment of the invention, a second network device 102a may generate a decision pertaining to implementing one or more energy efficient techniques and the second network device 102a may send a message to a first network device 102b, requesting that the first network device 102b implement the decision. The message sent to the first network device 102b may comprise the decision as well as values of parameters $AR_X$ and/or $AL_X$ utilized to generate the decision. The first network device 102b may receive the decision and parameter values and may determine whether the received parameter values are up-to-date.

The first network device 102b may determine whether to implement the decision based on whether the received parameter values are up-to-date. The first network device 102b may determine whether the received parameter values are up-to-date by comparing them to locally stored parameter values. The decision and the parameter values may be exchanged via one or more logical link discovery protocol data units (LLDPDUs). The first network device 102b may determine whether to comply with the request based on whether one of the first network device and the second network device is a master device. In instances that the received parameter vales are out-of-date, the first network device 102b may send one or more messages to the second network device to update the parameter values. The first network device 102b may also determine whether the request itself is out-of-date, and may ignore the request in instances that it is out-of-date. The first network device 102b may update the contents of one or more state registers 130b upon the occurrence of one or more of: reception of a message from the second network device 102a, transmission of a message to the second network device 102a, update of one or more of the parameter values, and reception of an out-of-date parameter value.

In various embodiments of the invention, the second network device 102a may implement the decision upon determining that the first network device 102b has complied with the request. The second network device 102a may determine compliance with the request based on, for example, an explicit response from the first network device 102b or a lack of response from the first network device 102b.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for stateful negotiation of energy efficient parameters in Layer 2.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for, carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
managing, via one or more circuits for use in a first network device, energy efficiency of communications between said first network device and a second network device by:
receiving, from said second network device, a request to implement a decision generated by said second network device, where parameter values utilized in generating said decision are received along with said request;
determining whether said received parameter values are up-to-date;
determining whether to comply with said request based on whether said parameter values are up-to-date;
determining whether said request is out-of-date; and ignoring said decision in instances that said request is out-of-date.

2. The method according to claim 1, comprising determining whether said received parameter values are out-of-date by comparing said received parameter values to locally stored parameter values.

3. The method according to claim 1, wherein said request and said parameters are received via one or more logical link discovery protocol data units (LLDPDUs).

4. The method according to claim 1, comprising determining whether to comply with said request based on whether one of said first network device and said second network device is a master device.

5. The method according to claim 1, comprising, in instances that said received parameter vales are out-of-date, sending one or more messages to said second network device to update said parameter values.

6. The method according to claim 1, comprising updating the contents of one or more state registers upon the occurrence of one or more of:
reception of a message from said second network device;
transmission of a message to said second network device;
update of one or more of said parameter values; and
reception of an out-of-date parameter value.

7. A method for networking, the method comprising:
performing by one or more circuits in a first network device:
generating a decision for managing the energy efficiency of communications between said first network device and a second network device;
communicating said decision to said second network device along with parameters utilized in generating said decision; and
implementing said decision upon determining that said second network device has implemented or will implement said decision.

8. The method according to claim 7, comprising communicating said decision and said parameters via one or more logical link discovery protocol data units (LLDPDUs).

9. The method according to claim 7, comprising modifying the contents of a state register to indicate said generation and/or said communication of said decision.

10. A system for networking, the system comprising:
one or more circuits for use in a first network device; said one or more circuits being operable to manage energy efficiency of communications between said first network device and a second network device by:
receiving, from a second network device, a request to implement a decision for managing energy efficiency of communications between said first network device and said second network device, where parameter values utilized in generating said decision are received along with said request;
determining whether said received parameter values are up-to-date;
determining whether to comply with said request based on whether said parameter values are up-to-date;
determining whether said request is out-of-date;
ignoring said decision in instances that said request is out-of-date; and
managing energy consumption based on said determinations.

11. The system according to claim 10, wherein said one or more circuits are operable to determine whether said received parameter values are out-of-date by comparing said received parameter values to locally stored parameter values.

12. The system according to claim 10, wherein said request and said parameters are received via one or more logical link discovery protocol data units (LLDPDUs).

13. The system according to claim 10, wherein said one or more circuits are operable to determine whether to comply with said request based on whether one of said first network device and said second network device is a master device.

14. The system according to claim 10, wherein said one or more circuits are operable to, in instances that said received parameter vales are out-of-date, send one or more messages to said second network device to update said parameter values.

15. The system according to claim 10, wherein said one or more circuits are operable to update the contents of one or more state registers upon the occurrence of one or more of:
reception of a message from said second network device;
transmission of a message to said second network device;
update of one or more of said parameter values; and
reception of an out-of-date parameter value.

16. A system for networking, the system comprising:
one or more circuits for use in a first network device, said one or more circuits being operable to:
generate a decision for managing the energy efficiency of communications between said first network device and a second network device;
communicate said decision to said second network device along with parameters utilized in generating said decision; and
implement said decision upon determining that said second network device has implemented or will implement said decision.

17. The system according to claim 16, wherein said one or more circuits are operable to communicate said decision and said parameters via one or more logical link discovery protocol data units (LLDPDUs).

18. The system according to claim 16, wherein said one or more circuits are operable to modify the contents of a state register to indicate said generation and/or said communication of said decision.

19. A method for networking, the method comprising:
managing, via one or more circuits for use in a first network device, energy efficiency of communications between said first network device and a second network device by:
receiving, from said second network device, a request to implement a decision generated by said second network device, where:
parameter values utilized in generating said decision are received along with said request;
a first one of said parameters values was generated by said second network device; and
a second one of said parameter values was generated by said first network device and previously communicated to said second network device from said first network device;
determining whether said received parameter values are up-to-date; and
determining whether to comply with said request based on whether said parameter values are up-to-date.

20. The method of claim 19, comprising determining whether said request is out-of-date and ignoring said decision in instances that said request is out-of-date.

21. The method according to claim 19, comprising determining whether said received parameter values are out-of-date by comparing said received parameter values to locally stored parameter values.

* * * * *